(12) United States Patent
Okayama (10) Patent No.: US 10,558,370 B2
(45) Date of Patent: Feb. 11, 2020

(54) INFORMATION PROCESSING APPARATUS, IMAGE PROCESSING METHOD, AND RECORDING MEDIUM FOR STORING JOB LOG INFORMATION

(71) Applicant: CANON KABUSHIKI KAISHA, Tokyo (JP)

(72) Inventor: Noritsugu Okayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/862,060

(22) Filed: Jan. 4, 2018

(65) Prior Publication Data

US 2018/0196613 A1 Jul. 12, 2018

(30) Foreign Application Priority Data

Jan. 11, 2017 (JP) .................................. 2017-002596

(51) Int. Cl.
*G06F 12/00* (2006.01)
*G06F 3/06* (2006.01)
*G06F 12/0871* (2016.01)
*G06F 12/0868* (2016.01)

(52) U.S. Cl.
CPC .......... *G06F 3/0616* (2013.01); *G06F 3/0674* (2013.01); *G06F 12/0868* (2013.01); *G06F 12/0871* (2013.01); *H04N 2201/0094* (2013.01)

(58) Field of Classification Search
CPC .. G06F 3/0616; G06F 12/0868; G06F 3/0674; G06F 12/0871; G06F 12/0246; G06F 3/0656; G06F 3/064; G06F 2212/7203; H04N 2201/0094
USPC ......................................................... 711/118
See application file for complete search history.

(56) References Cited

FOREIGN PATENT DOCUMENTS

JP 2005-258633 A 9/2005

*Primary Examiner* — Mardochee Chery
(74) *Attorney, Agent, or Firm* — Canon U.S.A., Inc. IP Division (57) ABSTRACT

Data stored in a hard disk drive (HDD) is processed to generate cache data to be stored in a random access memory (RAM). If a data access request is received from an application and valid cache data corresponding to the access request is present in the RAM, response data is acquired from the RAM, without accessing the HDD, and the response data is transmitted to the source of the access request. If the valid cache data corresponding to the access request is not present in the RAM, response data is acquired from the HDD and the response data is transmitted to the source of the access request. Consequently, the number of times of access to the HDD is reduced.

11 Claims, 6 Drawing Sheets

FIG. 1A

MULTIFUNCTION PERIPHERAL 100

INFORMATION PROCESSING APPARATUS, IMAGE PROCESSING METHOD, AND RECORDING MEDIUM FOR STORING JOB LOG INFORMATION

BACKGROUND

Field of the Disclosure

The present disclosure relates to an information processing apparatus, an image processing method, and a recording medium.

Description of the Related Art

In an information processing apparatus, such as a multifunction peripheral, a nonvolatile storage medium such as a hard disk drive is mounted to store data about the apparatus. The life of a hard disk drive tends to be shorter the heavier an access load. (an access frequency, usage count) is. Accordingly, a technique for reducing an access load on a hard disk drive is proposed. Japanese Patent Application Laid-Open No. 2005-258633 discusses a technique for reducing a load on a hard disk drive with a high failure occurrence rate by limiting access to the hard disk drive by using a cache memory.

In the technique discussed in Japanese Patent Application Laid-Open. No. 2005-258633, during the data read step, data is read from a hard disk drive with a low failure occurrence rate among a plurality of hard disk drives. During the data write step, when a hard disk drive with a high failure occurrence rate is present, data is written into the cache memory, instead of writing data into the hard disk drive. The data stored in the cache memory is written into the hard disk drive before the data stored in the cache memory is cleared. According to the technique discussed in Japanese Patent Application Laid-Open No. 2005-258633, in an apparatus including a plurality of hard disk drives, when failure occurrence rate of any one of the hard disk drives becomes high, the cache memory is used so as to prevent the use of the hard disk drive having a high failure occurrence rate.

However, the prior art fails to take into consideration the configuration for reducing degradation of a single hard disk drive to allow use of the hard disk drive for a longer period of time. In other words, the prior art fails to take into consideration the method for reducing degradation of a nonvolatile storage medium, such as a hard disk drive, before the failure occurrence rate in the nonvolatile storage medium increases.

SUMMARY

The present disclosure is directed to a technique for reducing degradation of a nonvolatile storage medium by reducing access to the nonvolatile storage medium in an information processing apparatus including a nonvolatile storage medium such as a hard disk drive. According to an aspect of the present disclosure, an information processing apparatus includes a nonvolatile storage device configured to store log information about processing executed by the information processing apparatus, a cache memory, and at least one processor that executes instructions to generate summarized data based on the log information, receive an acquisition request for acquiring the summarized data generated based on the log information, return, as response data, the summarized data stored in the cache memory in a case where valid data is stored in the cache memory as the summarized data corresponding to the acquisition request, return, as response data, the summarized data generated based on the log information acquired from the storage device in a case where no valid data is stored in the cache memory as the summarized data corresponding to the acquisition request, store the generated response data as the valid summarized data in the cache memory, and manage, in response to an update of the log information stored in the storage device, that no valid data is stored in the cache memory as the summarized data.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

A first exemplary embodiment of the present disclosure will now be described. An information processing apparatus according to the first exemplary embodiment includes a nonvolatile storage medium such as a hard disk drive for storing data about the apparatus. The information processing apparatus according to the first exemplary embodiment generates cache data based on an access frequency (inquiry frequency) or access request content (inquiry content) of access to data, and reduces access to the nonvolatile storage medium by using the generated cache data.

Figure 1A:
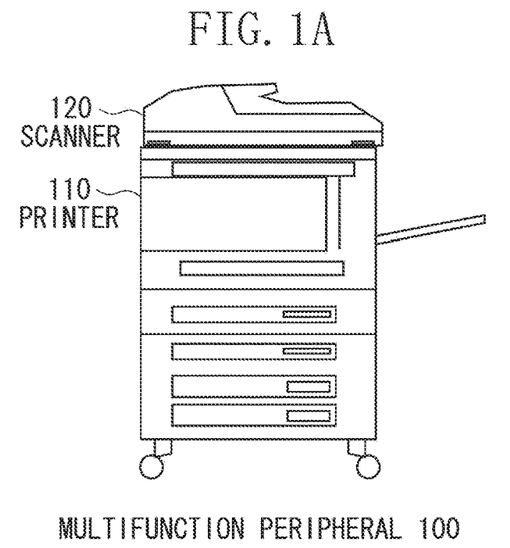
FIGS. 1A and 1B are diagrams each illustrating a configuration of a multifunction peripheral as an information processing apparatus according to an exemplary embodiment.

A configuration example of a multifunction peripheral 100 as the information processing apparatus according to the first exemplary embodiment will be described. FIG. 1A is an outline view illustrating the multifunction peripheral 100 according to the first exemplary embodiment. For example, an upper portion of the multifunction peripheral 100 according to the first exemplary embodiment is composed of a scanner 120, and a lower portion of the multifunction peripheral 100 is composed of a printer 110.

Figure 1B:
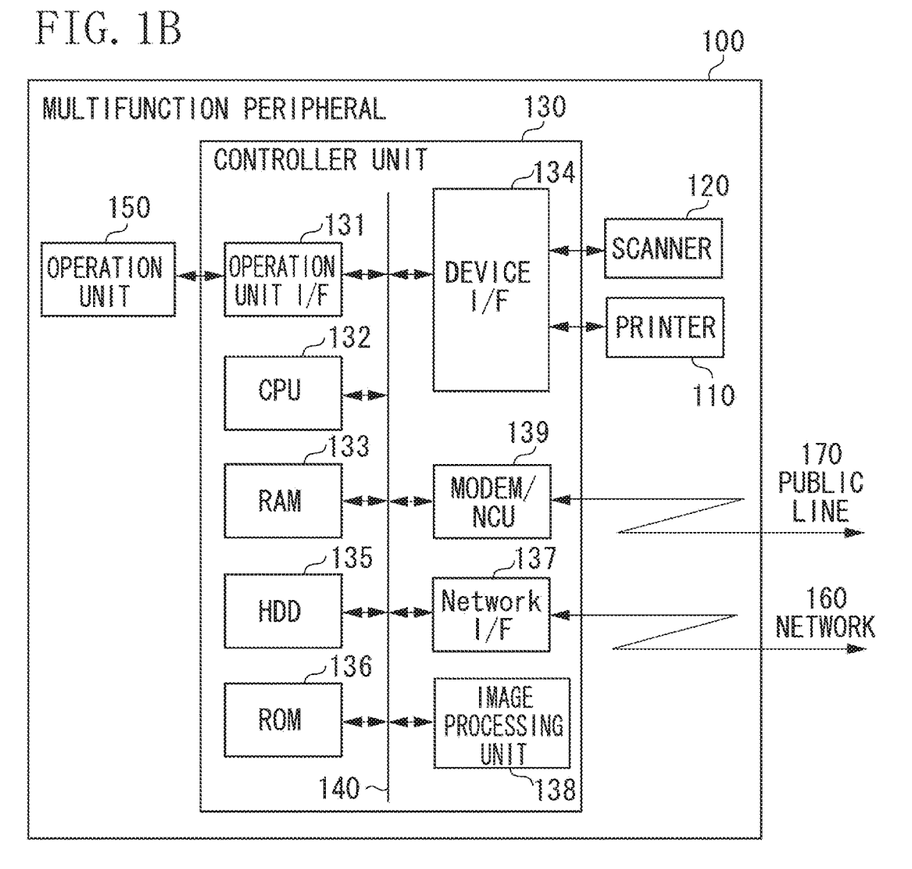

FIG. 1B is a block diagram illustrating a hardware configuration example of the multifunction peripheral 100 according to the first exemplary embodiment. The multifunction peripheral 100 includes a controller unit 130, an operation unit 150, the scanner 120, and the printer 110. The controller unit 130 is connected to the operation unit 150 and is also connected to the scanner 120 serving as an image input device and to the printer 110 serving as an image output device.

The controller unit 130 includes a central processing, unit (CPU) 132. The CPU 132 reads out a program (software) stored in a read only memory (ROM) 136 and executes the program to thereby control the operation of the multifunction peripheral 100. For example, the CPU 132 activates an operating system (OS) by a boot program stored in the ROM 136. Further, the CPU 132 executes application programs stored in the ROM 136 on the OS, thereby executing various processes.

A random access memory (RAM) 133 is a memory that is used as a work area for the CPU 132 and also as a cache area for storing data. The ROM 136 stores programs and the like to be executed by the CPU 132. A hard disk drive (HDD) 135, which is a nonvolatile storage medium for storing data about the apparatus, stores various log data on processing history, such as a print job history and a facsimile (FAX) communication history, which are executed in the multifunction peripheral 100. The RAM 133, the HDD 135, and the ROM 136 are each connected to the CPU 132 via a system bus 140.

The CPU 132 is connected to an operation unit interface 131, a device interface 134, a network interface 137, an image processing unit 138, and a modulator-demodulator (MODEM)/network control unit (NCU) 139 via the system bus 140. The operation unit interface 131 is an interface with the operation unit 150 including a touch panel and operation buttons. For example, image data to be displayed on a display unit, such as the touch panel included in the operation unit 150, is output to the operation unit 150. The device interface 134 is connected to each of the scanner 120 and the printer 110. The device interface 134 performs synchronous/asynchronous conversion of the image data.

The network interface 137 is connected to a network 160 to receive information from each apparatus on the network 160 and output information thereto via the network 160. The image processing unit 138 performs processing such as input image processing on an image input from the scanner 120, output image processing for outputting an image to the printer 110, image rotation, image compression, resolution conversion, color space conversion, or tone conversion. The MODEM/NCU 139 has a function of modulating and demodulating signals transmitted to and received from a facsimile apparatus and sending a selection signal (a dial pulse signal or a tone signal) to a public line 170, and also performs a facsimile incoming call operation by detection of a call signal.

Figure 2:
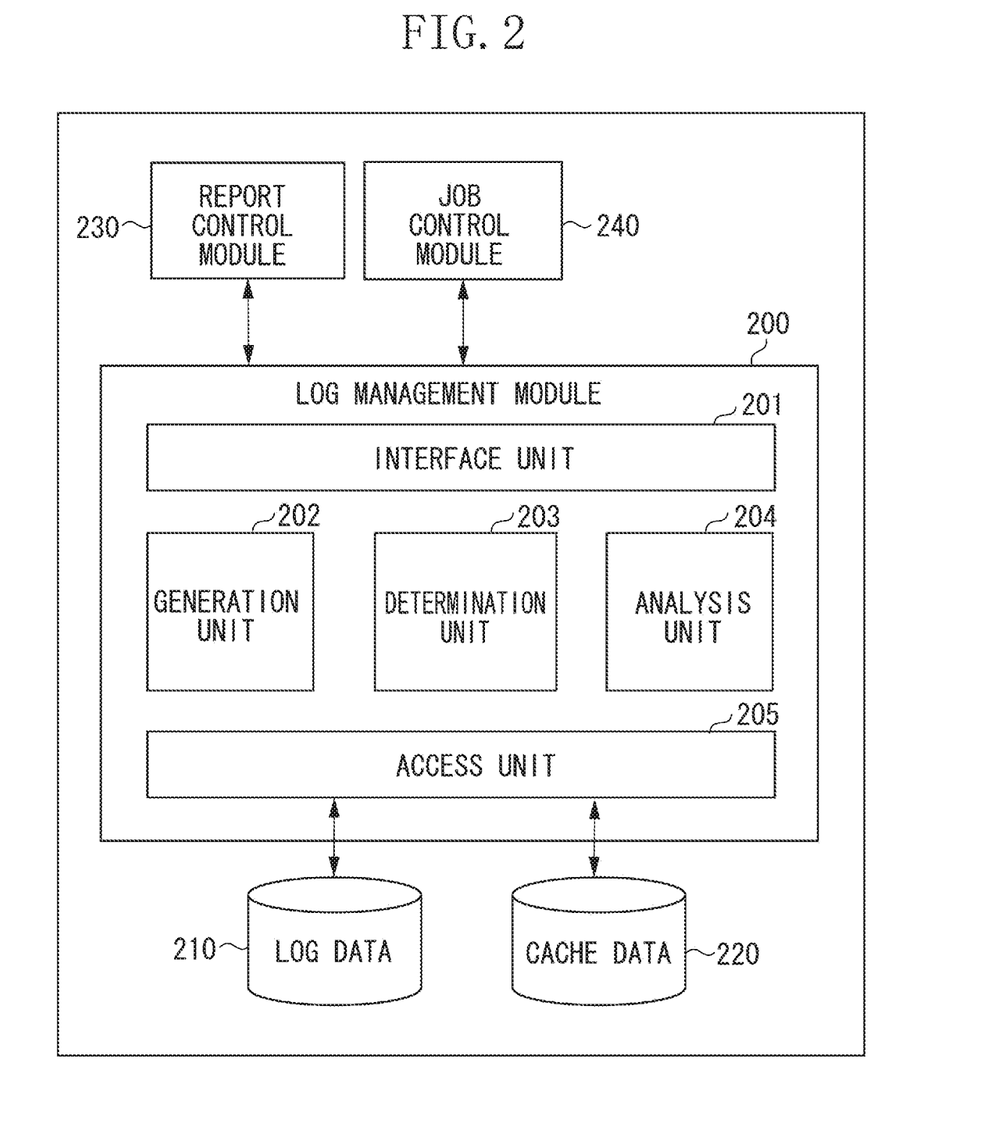
FIG. 2 is a block diagram illustrating a configuration of software in the multifunction peripheral according to an exemplary embodiment.

FIG. 2 is a block diagram illustrating a configuration example of software in the multifunction peripheral 100 according to the first exemplary embodiment. FIG. 2 illustrates a log management module 200, the functions of which are implemented by software in the multifunction peripheral 100, and related modules. The log management module 200 reads or writes log data 210 according to requests from various applications such as a report control module 230 and a job control module 240 which access the log data 210 in the multifunction peripheral 100. The log data 210 is data on processing history in the apparatus, such as a print job history and a FAX communication history, which are executed in the multifunction peripheral 100, and the log data 210 is stored in the HDD 135.

The log management module 200 includes an interface unit 201, a generation unit 202, a determination unit 203, an analysis unit 204, and an access unit 205. The interface unit 201 receives requests for reading and writing the log data 210 from the outside of the log management module 200. The analysis unit 204 analyzes the read request (log access request) for reading the log data 210 received by the interface unit 201, and calculates a load an the HDD 135 based on a request content, a request frequency, or the like. When the analysis unit 204 determines that the calculated load on the HDD 135 is higher than a predetermined threshold, the analysis unit 204 determines that it is necessary to generate cache data 220 corresponding to data (response data) to be supplied in response to the read request.

The generation unit 202 generates the cache data 220 based on the log data 210. The cache data 220 is, for example, the log data 210 acquired from the HDD 135. Specifically, the generation unit 202 generates summarized data based on the log data 210. Examples of the summarized data include the number of records of unread FAX job log, an ID of a latest read log, and a job list of latest 2000 reports to be output. The cache data 220 generated by the generation unit 202 is stored in the RAM 133. The determination unit 203 determines whether the cache data 220 is valid or invalid in response to the read request for reading the log data 210 received by the interface unit 201. Specifically, the determination unit 203 determines whether response data corresponding to the read request for reading the log data 210 is present in the RAM 133 as the valid cache data 220. If the cache data 220 is valid, the access unit 205 accesses the cache data 220 to acquire the response data. If the cache data 220 is invalid, the access unit 205 accesses the log data 210 to acquire the response data.

Figure 3:
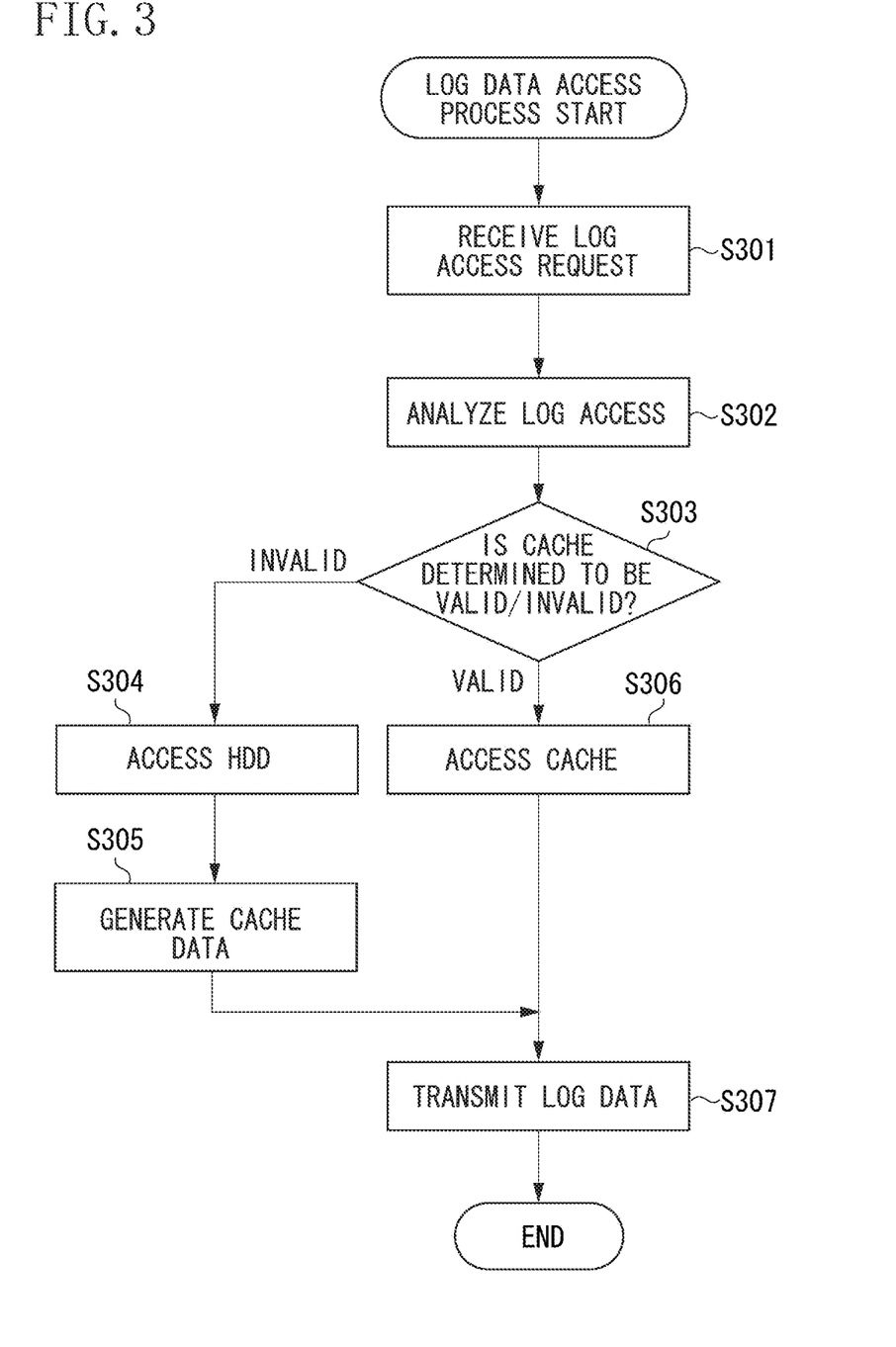
FIG. 3 is a flowchart illustrating an example of an access process according to an exemplary embodiment.

FIG. 3 is a flowchart illustrating an example of a log data access process in the multifunction peripheral 100 according to the first exemplary embodiment. The process in the flowchart illustrated in FIG. 3 is carried out in such a manner that the CPU 132 implements the functions of the log management module 200 illustrated in FIG. 2 by reading and executing the programs stored in the ROM 136.

In step S301, the interface unit 201 of the log management module 200 receives the log access request (read request) from an application outside of the log management module 200. In step S302, the analysis unit 204 of the log management module 200 analyzes the log access request received by the interface unit 201, and determines whether it is necessary to activate the cache, or whether it is necessary to generate the cache data 220.

In processing of step S302, for example, as illustrated in Table 1, the analysis unit 204 counts up the number of times of access for each access request content of the log access request received in step S301. The analysis unit 204 obtains the frequency of access to the log data with respect to an operating time of the HDD 135 based on the counted number of times of access. If the access frequency is equal to or more than a threshold, the analysis unit 204 determines that the cache is required to be activated for the access request content.

In an example illustrated in Table 1, if the access frequency is once or more per minute, the analysis unit 204 determines that the cache is required to be activated. Note that the threshold, such as once or more per minute, which is used for determination, can be changed depending on the performance of the HDD 135, the useful life of the apparatus, or the like. The analysis unit 204 measures an access time for each access request content, and obtains an access time to the HDD with respect to the operating time of the HDD 135. If the access time is equal to or more than the threshold, the analysis unit 204 may determine that the cache is required to be activated for the access request content.

TABLE 1

| Access request content | Number of times of access | Access frequency | Whether to activate cache | Cache valid/invalid |
|---|---|---|---|---|
| Number of records of unread FAX job log | 100 | once/min. | required to activate | valid |
| Latest read log ID | 30 | 0.3 times/min. | not required | invalid |
| Job list of latest 2000 reports to be output | 1 | 0.01 times/min. | not required | invalid |
| . . . | | | | |

In processing of step S302, for example, the access request content for which the cache is required to be activated may be determined in advance, for example, as illustrated in Table 2, instead of determining the access frequency. Then, the analysis unit 204 may determine that the cache is required to be activated in accordance with the access request content. In an example illustrated in Table 2, if the access request content is "the number of records of unread FAX job log", the analysis unit 204 determines that the cache is required to be activated.

TABLE 2

| Access request content | Whether to activate cache | Cache valid/invalid |
|---|---|---|
| Number of records of unread FAX job log | required to activate | valid |
| Latest read log ID | not required | invalid |
| Job list of latest 2000 reports to be output | not required | invalid |
| . . . | | |

Next, in step S303, the determination unit 203 of the log management module 200 performs cache valid/invalid determination to determine whether the valid cache data 220 is present in the RAM 133 for the log access request received by the interface unit 201. Whether the cache is valid or invalid may be determined based on information about valid or invalid of the cache for the access request contents illustrated in Table 1 and Table 2, or may be determined based on the state of the cache data 220.

If the determination unit 203 determines that the valid cache data is not present in the RAM 133, i.e., the cache data 220 is invalid (INVALID in step S303), the processing proceeds to step S304. In step S304, the access unit 205 of the log management module 200 accesses the HDD 135 to access the log data 210. Next, if the content of the access request indicates that it has been determined in step S302 that the cache is required to be activated, the generation unit 202 of the log management module 200 generates the cache data. 220, stores the generated cache data 220 in the RAM 113, and activates the cache in step S305. More specifically, if the content of the access request indicates that the cache is required to be activated in Table 1 or Table 2, the generation unit 202 generates the cache data 220, stores the generated cache data 220 in the RAM 133, and activates the cache.

In this case, the generation unit 202 generates the cache data 220 corresponding to the access request content based on the log data 210 that has been read in step S304. The generation unit 202 generates the cache data 220 by processing the log data 210 in accordance with a request from the report control module 230 or the like that accesses the log management module 200, instead of using a part of the read log data 210. Table 3 illustrates an example of the cache data 220 generated in step S305. Table 3 illustrates an example in which a value "1" obtained by counting the number of records of unread FAX job log in the log data is stored as the cache data 220. In this way, the storage capacity of the RAM 133 to be used as a result of activating the cache can be suppressed.

TABLE 3

| Access request content | Cache data |
|---|---|
| Number of records of unread FAX job log | 1 |
| . . . | |

As a result of determination in step S303, if the determination unit 203 determines that the valid cache data is present in the RAM 133, i.e., the cache data 220 is valid (VALID in step S303), the processing proceeds to step S306. In step S306, the access unit 205 accesses the cache area of the RAM 133 to access the cache data 220. In step S307, the log management module 200 transmits, via the interface unit 201 or the like, the data (response data) acquired in step S304 or S306 to the application which has transmitted the log access request and terminates the access process.

Figure 4:
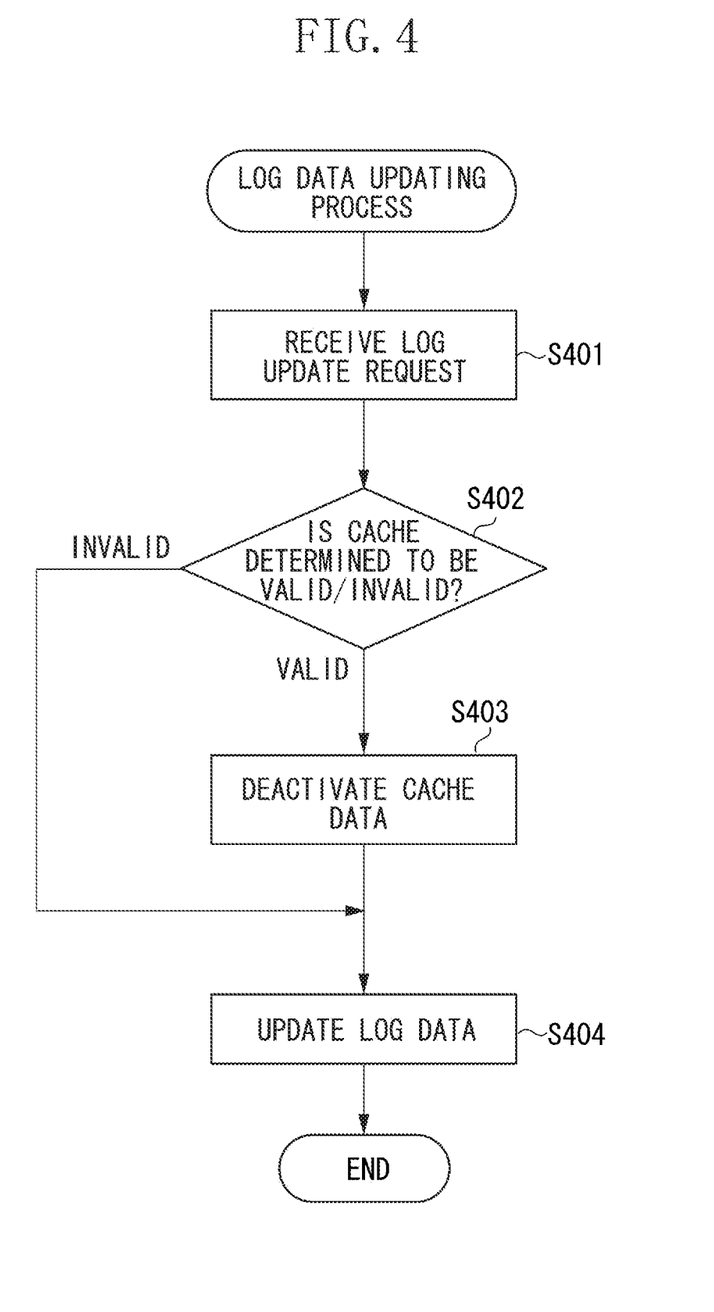
FIG. 4 is a flowchart illustrating an example of a data updating process according to an exemplary embodiment.

FIG. 4 is a flowchart illustrating an example of a log data updating process in the multifunction peripheral 100 according to the first exemplary embodiment. If the log data 210 to be stored in the HDD 135 is updated, inconsistency occurs between the log data 210 and the cache data 220 stored in the RAM 133. Accordingly, at the time of updating the log data 210, there is a need to deactivate the cache data 220 stored in the RAM 133. The log data updating process illustrated in FIG. 4 is carried out in such a manner that the CPU 132 reads a program stored in the ROM 136 and executes the program.

In step S401, the log management module 200 receives an update request for updating the log data 210. Next, in step S402, the log management module 200 performs cache valid/invalid determination to determine whether the cache data 220 is valid or invalid. If it is determined that the cache data 220 is valid (VALID in step S402), the log management module 200 deactivates the cache data 220 stored in the RAM 133 in step S403. If it is determined that the cache data 220 is invalid (INVALID in step S402), step S403 is omitted. Next, in step S404, the log management module 200 accesses the HDD 135 to update the log data 210, and terminates the updating process.

According to the first exemplary embodiment, the log access request from the application is analyzed, and when the access frequency or access time of access to the HDD 135 is equal to or more than the threshold, the cache data corresponding to the access request content is generated and stored in the RAM 133. Thus, the number of times of access to the HDD 135 in response to a log access request with a high access frequency or a long access time can be reduced. Consequently, degradation of the HDD 135 can be suppressed and thus the life of the HDD 135 can be improved.

For example, in a case where no cache data is used, the HDD 135 is accessed once per minute with regard to the access for "the number of records of unread FAX job log" as illustrated in Table 1. On the other hand, according to the present exemplary embodiment, the HDD 135 is accessed only at the time of generating cache data, so that a reduction in the number of times of access to the HDD 135 can be expected. Caching only some items with a high access frequency or a long access time, instead of caching all items, leads to reduction of the storage capacity used for the cache area.

Next, a second exemplary embodiment of the present disclosure will be described. An information processing apparatus according to the second exemplary embodiment includes a nonvolatile storage medium such as a hard disk drive for storing data about the apparatus. In the second exemplary embodiment, whether to generate cache data for each member in a data record can be selected, and the selected member is cached to thereby reduce the number of times of access to the nonvolatile storage medium. Note that the configuration of the multifunction peripheral as the information processing apparatus according to the second exemplary embodiment is similar to that of the first exemplary embodiment illustrated in FIGS. 1A, 1B, and 2, and thus the description thereof will be omitted.

Figure 5:
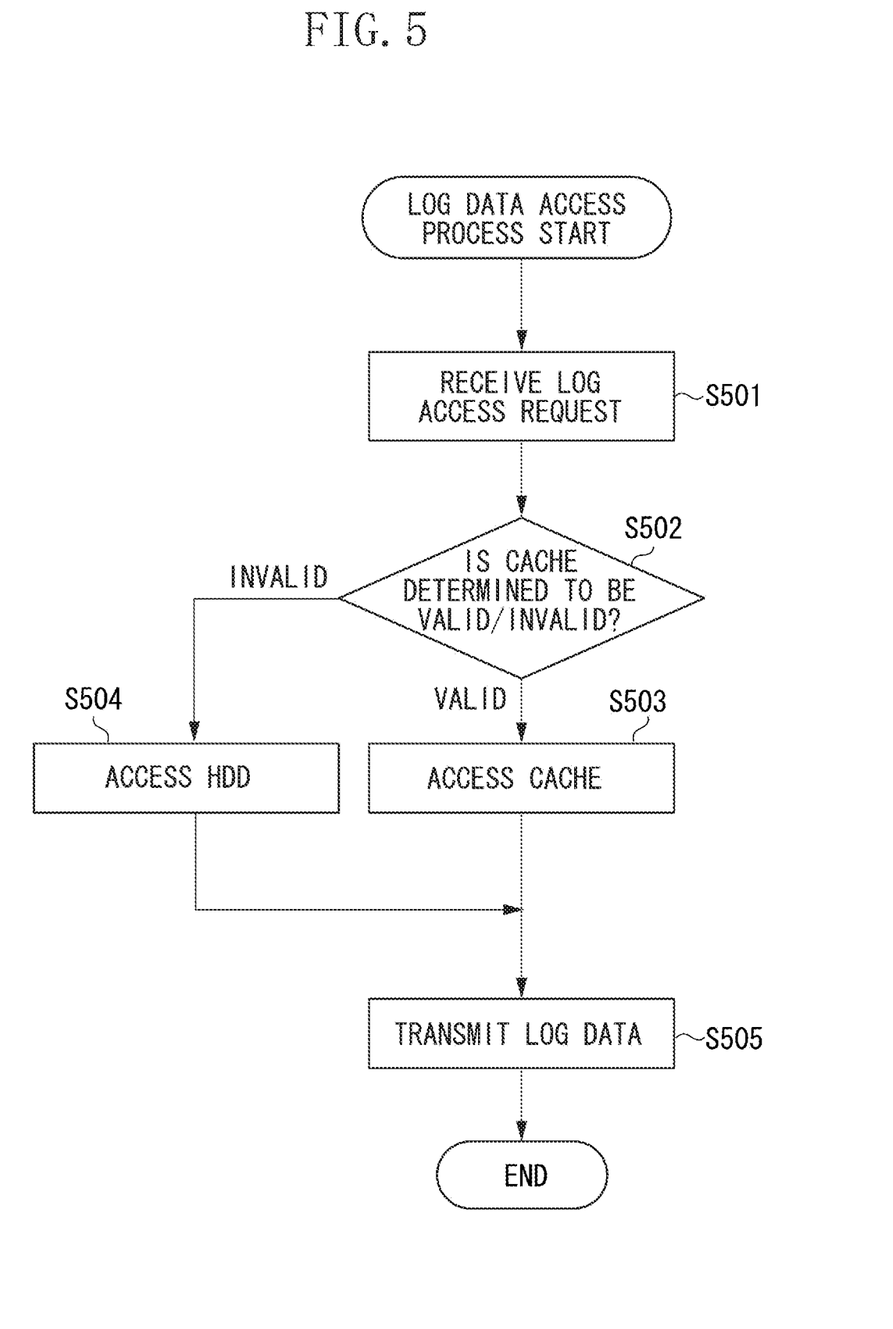
FIG. 5 is a flowchart illustrating an example of an access process according to an exemplary embodiment.

FIG. 5 is a flowchart illustrating an example of a log data access process in the multifunction peripheral 100 according to the second exemplary embodiment. Processing of the flowchart illustrated in FIG. 5 is carried out in such a manner that the CPU 132 implements the functions of the log management module 200 illustrated in FIG. 2 by reading and executing the programs stored in the ROM 136.

In step S501, the interface unit 201 of the log management module 200 receives a log access request (read request) from an application outside of the log management module 200. In step S502, the determination unit. 203 of the log management module 200 performs cache valid/invalid determination to determine whether the valid cache data 220 corresponding to the log access request received by the interface unit 201 is present in the RAM 133.

A table as illustrated in Table 4 is used for the cache valid/invalid determination in step S502. If the access request content of the log access request indicates that the access is for members in the log data which are valid according to the cache valid/invalid information in the table, the determination unit 203 determines that the valid cache data is present, i.e., the cache data 220 is valid. For example, in the example illustrated in Table 4, if the access request content indicates that the access is for a log ID, a job type, and a read flag, which are valid according to the cache valid/invalid information, the determination unit 203 determines that the cache data 220 is valid.

TABLE 4

| Log member | Log ID | Job type | Read flag | Execution result | User name | Address | Job name |
|---|---|---|---|---|---|---|---|
| Cache valid/ invalid | Valid | Valid | Valid | Invalid | Invalid | Invalid | Invalid |

If the determination unit 203 determines that the valid cache data is not present, i.e., the cache data 220 is invalid (INVALID in step S502), the access unit 205 accesses the HDD 135 to access the log data 210 in step S504. On the other hand, if the determination unit 203 determines that the valid cache data is present, i.e., the cache data 220 is valid (VALID in step S502), the access unit 205 accesses the cache area of the RAM 133 to access the cache data 220 in step S503. In step S505, the log management module 200 transmits, via the interface unit 201 or the like, the data (response data) acquired in step S503 or S504 to the application which has transmitted the log access request and terminates the access process.

Figure 6:
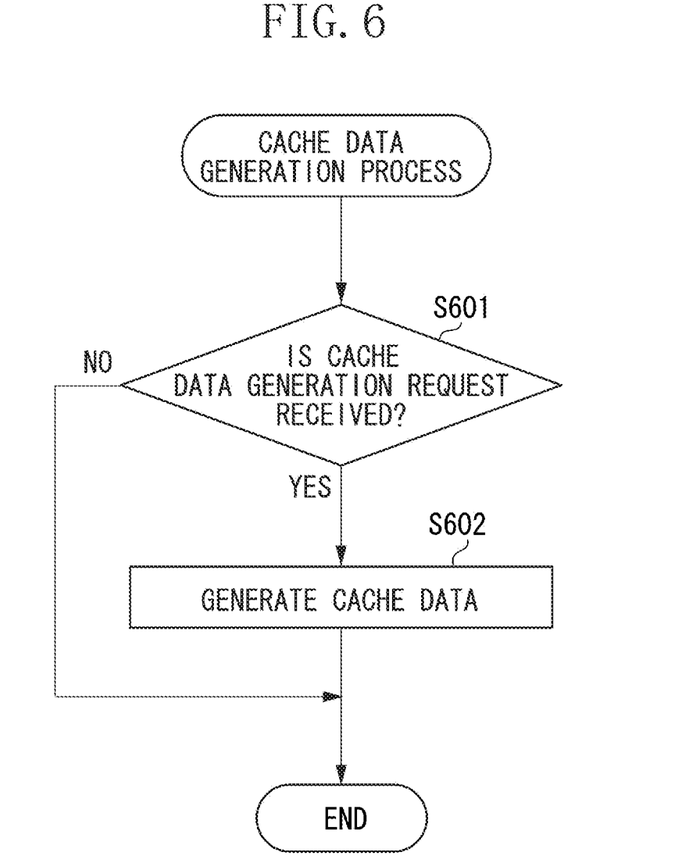
FIG. 6 is a flowchart illustrating an example of a data generation process according to an exemplary embodiment.

FIG. 6 is a flowchart illustrating an example of a cache data generation process in the multifunction peripheral 100 according to the second exemplary embodiment. The cache data generation process is carried out in such a manner that the CPU 132 reads a program stored in the ROM 136 and executes the program. In step S601, the log management module 200 receives a request for generating the cache data 220 from the outside of the log management module 200, such as the report control module 230. If the request for generating the cache data 220 is received in step S601 (YES in step S601), the log management module 200 generates the cache data 220 based on the log data 210, stores the generated cache data 220 in the RAM 133, and activates the cache in step S602. In this case, the cache data 220 is generated by processing the log data 210 according to the designation of data. For example, data for activating the cache can be designated by information in the table as illustrated in Table 4 This designation may be dynamically switched by an application, or may be statically designated.

Assume herein that, for example, the log data 210 corresponds to data illustrated in Table 5.

TABLE 5

| Log ID | Job type | Read flag | Execution result | User Name | Address | Job name |
|---|---|---|---|---|---|---|
| 1 | FAX job | 1 | OK | aaa | 044-425-432 | |
| 1 | Print job | 0 | OK | admin | | test.pdf |
| 2 | FAX job | 0 | NG | bbb | 044-111-123 | |
| 1 | Copy job | 0 | OK | 7654321 | | |
| 2 | Print job | 0 | OK | bbb | | test_0002.pdf |
| ... | ... | ... | ... | ... | | ... |

In this case, as illustrated in Table 6, the log management module 200 acquires, from the log data 210 of the HDD 135, only some members in the log data in which the cache valid/invalid information indicates valid in Table 4, and arranges the acquired data on the RAM 133 as the cache data 220.

TABLE 6

| Log ID | Job type | Read flag |
|---|---|---|
| 1 | FAX job | 1 |
| 1 | Print job | 0 |
| 2 | FAX job | 0 |
| 1 | Copy job | 0 |
| 2 | Print job | 0 |
| ... | ... | ... |

According to the second exemplary embodiment, cache data is generated for only some of the members selected from among the members of the log data, thereby making it possible to reduce the number of times of access to the HDD 135, while suppressing the storage capacity of the RAM 133 to be used as the cache area. Consequently, degradation of the HDD 135 can be suppressed and thus the life of the HDD 135 can be improved. Furthermore, in the second exemplary embodiment, the cache data generation process can be executed at the time of activating the multifunction peripheral 100, or at any timing by an application that accesses the log management module 200.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded t broadest interpretation so as to encompass all such modifications and equivalent structures and functions.

This application claims the benefit of Japanese Patent Application No. 2017-002596, filed Jan. 11, 2017, which is hereby incorporated by reference herein in its entirety.

What is claimed is:

1. An information processing apparatus comprising:
   a nonvolatile storage device configured to store job log information;
   a cache memory; and
   at least one processor that executes instructions to:
   generate summarized data based on the job log information stored in the nonvolatile storage device;
   cache, in the cache memory, the summarized data;
   receive, from an application, an acquisition request for acquiring summarized data;
   return, to the application, the summarized data which is cached in a case where the summarized data cached in the cache memory is valid; and
   acquire updated job log information from the storage device and return, to the application, summarized data which is generated based on the updated job log information in a case where the summarized data cached in the cache memory is invalid.

2. The information processing apparatus according to claim 1,
   wherein the job log information includes one or more job logs and a job log includes a plurality of log items, and
   wherein the at least one processor executes instructions to:
   cache, in the cache memory, the summarized data generated based on log information about a first item among the plurality of log items;
   wherein summarized data generated based on a second item among the plurality of items is not cached in the cache memory.

3. The information processing apparatus according to claim 1,
   wherein the log information includes one or more job logs, and
   wherein the summarized data indicates a number of one or more job logs which satisfy a predetermined condition among the one or more job logs stored in the nonvolatile storage unit.

4. The information processing apparatus according to claim 1,
   wherein the log information includes one or more job logs and a job log includes a plurality of log items and
   wherein the at least one processor executes instructions to set, for each log item, information indicating whether to cache summarized data in the cache memory.

5. The information processing apparatus according to claim 1,
   wherein the log information includes one or more job logs and a job log includes a plurality of log items, and
   wherein the at least one processor executes instructions to determine, for each log item, whether to cache the summarized data an access frequency or access time to the storage device for acquiring summarized data of the log item.

6. The information processing apparatus according to claim 5, wherein the at least one processor executes instructions to cache the summarized data in the cache memory in a case where the access frequency or access time to the storage device is equal to or more than a threshold.

7. The information processing apparatus according to claim 1, wherein in a case where the log information stored in the storage device is updated, the summarized data stored in the cache memory becomes invalid.

8. The information processing apparatus according to claim 1, wherein the storage device is a hard disk drive and cache memory is a random access memory.

9. A control method for an information processing apparatus including a nonvolatile storage device and a cache memory, the method comprising:
   storing job log information in the nonvolatile storage device;
   generating summarized data based on the log information stored in the nonvolatile storage device;
   caching, in the cache memory, the summarized data;
   receiving, from an application, an acquisition request for acquiring summarized data;
   returning, to the application, the summarized data which is cached in a case where summarized data cached in the cache memory is valid;
   acquiring updated job log information from the storage device and returning, to the application, summarized data which is generated based on the updated job log information in a case where the summarized data cached in the cache memory is invalid.

10. The information processing apparatus according to claim 1,
    wherein the log information includes one or more job logs,
    wherein the summarized data indicates a number of one or more job logs which satisfy a predetermined condition among the one or more job logs stored in the nonvolatile storage unit, and wherein the number of one or more job logs increases by updating the log information in the nonvolatile storage device.

11. An information processing apparatus comprising:

a nonvolatile storage device configured to store job log information;

a cache memory; and at least one processor that executes instructions to:

receive, from an application, a first acquisition request for summarized data of the job log information;

generate the summarized data based on the job log information stored in the nonvolatile storage device;

cache, in the cache memory, the summarized data which is generated;

return the summarized data which is generated in accordance with the first acquisition request;

receive, from the application, a second acquisition request for summarized data from the application;

return, in a case where the second acquisition request is received and the job log information stored in the nonvolatile storage device has not been updated since the summarized data was cached until the second acquisition is received, the summarized data cached in the cache memory, without accessing the nonvolatile storage device; and return, in a case where the second acquisition request is received and the job log information stored in the nonvolatile storage device is updated after the summarized data was cached and before the second acquisition request is received, summarized data which is generated based on the updated job log information acquired from the storage device.

* * * * *